United States Patent [19]

Janes

[11] Patent Number: 4,880,087

[45] Date of Patent: Nov. 14, 1989

[54] TELESCOPIC SHOCK ABSORBER CONSTRUCTION

[75] Inventor: Geoffrey G. Janes, York, England

[73] Assignee: Armstrong Patents Co. Limited, England

[21] Appl. No.: 130,744

[22] Filed: Dec. 9, 1987

[30] Foreign Application Priority Data

Dec. 11, 1986 [GB] United Kingdom ................ 8629682

[51] Int. Cl.$^4$ ............................................. F16F 9/36
[52] U.S. Cl. .......................... 188/322.16; 188/322.17; 29/511
[58] Field of Search ...................... 188/322.16, 322.11; 29/511; 277/24, 27, 152, 153, 181, 182, 183

[56] References Cited

U.S. PATENT DOCUMENTS

| | | | |
|---|---|---|---|
| 4,335,871 | 6/1982 | Molders | 267/64 |
| 4,386,686 | 6/1983 | Miura | 188/322.17 |
| 4,480,730 | 11/1984 | Koller et al. | 188/315 |
| 4,482,036 | 11/1984 | Wossner et al. | 188/322.17 |
| 4,542,811 | 9/1985 | Miura | 188/322.17 |

FOREIGN PATENT DOCUMENTS

| | | |
|---|---|---|
| 2232238 | 1/1973 | Fed. Rep. of Germany . |
| 1810531 | 12/1975 | Fed. Rep. of Germany . |
| 3202705 | 11/1984 | Fed. Rep. of Germany . |
| 1365551 | 9/1974 | United Kingdom . |
| 1386646 | 3/1975 | United Kingdom . |
| 1450571 | 9/1976 | United Kingdom . |

Primary Examiner—Andres Kashnikow
Assistant Examiner—Matthew C. Graham

[57] ABSTRACT

A twin-tube shock absorber of a "sealed for life" construction comprising an outer cylinder (1), an inner cylinder (4), a piston rod (5) housed within the inner cylinder (4), a guide member (8) to locate the piston rod (5) within the inner cylinder (4) and a metal insert seal (10) located inside the top end of the outer cylinder (1), above the guide member (8), and slidably embracing the piston rod (5). The guide member (8) is clamped in place within the shock absorber by a circumferential shoulder (17) in the outer cylinder (1), which is produced, after assembly of the internal parts, by a lateral swaging operation which creates a reduced diameter, parallel portion of the outer cylinder (1) above the shoulder (17).

6 Claims, 4 Drawing Sheets

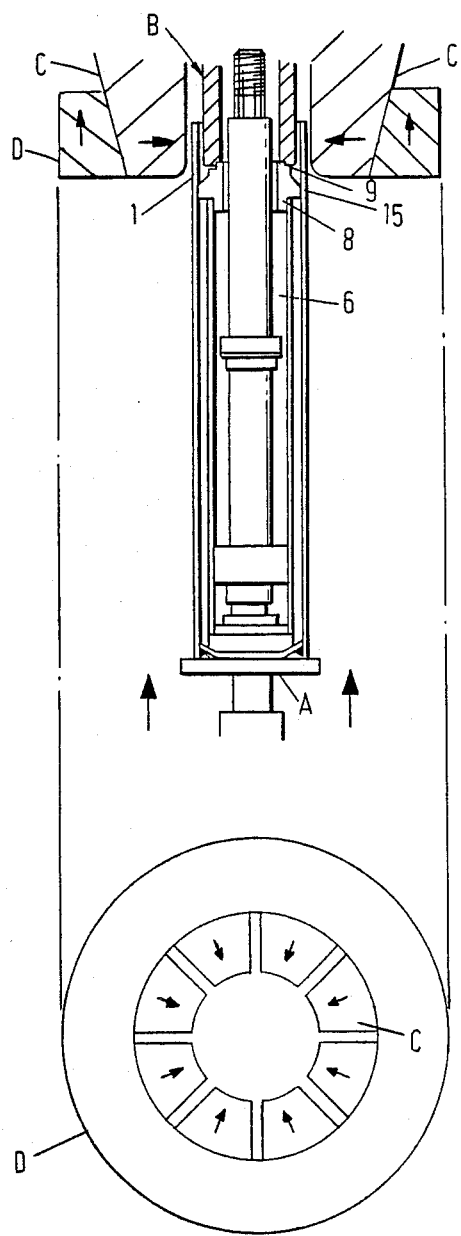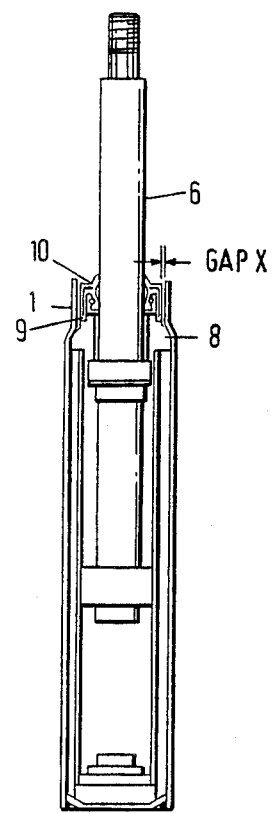
FIG.3
FIG.4

TELESCOPIC SHOCK ABSORBER CONSTRUCTION

DESCRIPTION

The present invention relates to an improved arrangement for clamping together the internal parts of a telescopic shock absorber and for sealing the hydraulic fluid contained within the shock absorber, and for pressurising the air space within the shock absorber.

In particular, the present invention relates to what is called a "twin-tube" shock absorber and to that version of a "twin-tube" shock absorber which is used on a vehicle as a suspension strut. Such suspension struts are usually known in the art as "Macpherson Struts", the name referring to their original inventor. When installed on a vehicle, the attitude of suspension struts is usually substantially vertical or nearly so, and therefore, for descriptive purposes, the opposing ends of the strut assembly may reasonably be termed "upper" and "lower" and this nomenclature will be adopted hereinafter.

Twin-tube telescopic shock absorbers of the type in question basically comprise two cylinders, coaxially arranged with respect to each other, one within the other. The inner cylinder houses a piston connected to a piston rod which is movable within the inner cylinder. The piston rod projects from the upper end of the cylinder and slides freely in a bearing located at its point of emergence from the cylinder. The bearing is housed in a guide member which fulfills a dual function of centrally locating the bearing within the inner cylinder and the inner cylinder within the coaxial outer cylinder. The lower end of the outer cylinder is closed by an end cup or plate usually welded to the outer cylinder around its periphery. The lower end of the inner cylinder is closed by a foot valve assembly which carries on its underside a suitable registering means, such as a conical form, which enables it to locate centrally in the end cup which closes the outer cylinder.

During normal operation of the shock absorber the inner cylinder is completely full of hydraulic fluid, such as oil, on both sides of the piston. The annular space between the inner and outer cylinders is partially filled with oil and provides an oil reservoir. The remaining space is occupied by air. For proper functioning of the shock absorber it is desirable that the pressure within the air space should not fall below atmospheric. In some cases the pressure may be required to exceed atmospheric pressure in which case the shock absorber is positively charged during its manufacture with compressed air or some other gas such as nitrogen.

The foot valve assembly is furnished with suitable holes and valves which enable oil to pass from the inner cylinder to the reservoir and back again, according to the direction of motion of the piston. The piston is furnished with suitable holes and valves which enable oil to pass from one side of the piston to the other according to its direction of motion. The upper end of the shock absorber or suspension strut according to known art can be closed by a variety of means usually consisting of one or more metal closure members and one or more elastomeric seals.

The seals normally used conventionally in Macpherson struts are of the 'metal insert' type, in that they have an annular metal piece bonded within a body of elastomeric material. This provides a measure of rigidity and separates the functional portion of the seal, comprising sealing lips which engage on the movable piston rod, from the outer portion of the seal which is generally engaged in or on a mating metal component to provide a static seal round its periphery.

In conventional twin-tube shock absorbers, the metal insert seal is normally housed as a press fit in a separate top cap, or in a recess provided for the purpose in the piston rod guide member.

Some shock absorbers are constructed with a threaded member at the top end which engages in a thread in the outer cylinder and clamps the internal parts together. Such shock absorbers can be taken apart for repair purposes but more often the shock absorber is manufactured as a 'sealed-for-life' item which cannot be dismantled. The present invention relates to this latter category. Normal practice is for the internal parts to be clamped together with a specified pre-load, and for the final closing operation to consist of either a welding operation to join the top cap or similar member to the outer cylinder, or to deform the top edge of the outer cylinder by a suitable spinning or pressing operation so that it then encloses the uppermost of the internal parts and holds them in position.

During the final closure operation, it is normal for the piston rod to be in the fully extended position, thus ensuring that the air space within the shock absorber is at atmospheric pressure in this condition, and consequently at higher than atmospheric pressure when the piston rod is in any other position.

Each of the known methods of construction described above suffers from one or more of the disadvantages listed hereinafter.

1. Some known methods of closure require the internal parts of the shock absorber to be clamped together prior to the closing operation. If for any reason in the course of manufacture the clamping force should be insufficient, or non-existent, then functional problems arise with the shock absorber due to looseness or rattling of the internal parts.

2. When welding is used as the closure method this can involve a number of problems:

(a) Due to the presence of oil in the shock absorber the parts to be welded are usually contaminated with oil which may result in a substandard weld and possible subsequent leakage.

(b) Close control must be exercised on the fit of the parts being welded. If the fit is too slack distortion of the outer cylinder can occur during welding causing a substandard weld. If the fit is too tight, additional clamping force may be required to ensure satisfactory clamping of the internal parts.

(c) Although every effort is normally made in the design to position the seal as far as possible from the area to be welded, nevertheless the close proximity of the elastomeric seal(s) means that the welding heat must be kept to a minimum to avoid over-heating or burning of the seal(s). This is often achieved by flooding the assembly with water during welding, but this may result in water entering the assembly via any excessive clearance between the parts being welded and thus contaminating the oil in the shock absorber.

(d) If excessive heat or radial pressure is applied during welding, these factors, or subsequent contraction, may result in the guide bore being closed in, causing a reduction in the running clearance of the piston rod.

3. If the final closure operation is done by any of the known methods of deforming the top edge of the outer cylinder over the uppermost of the internal parts, close attention has to be paid in quantity production to the tolerances on axial length of the various components, to ensure that the optimum length of outer cylinder always protrudes above the internal parts prior to the closure operation. If the amount of the protrusion is too great or too small an inadequate closure may result.

4. In the normal manufacture of twin tube shock absorbers, cost considerations usually dictate that the steel tubing used for the outer cylinder is of the type known as 'electric resistance welded'. This type of tubing is made by rolling a flat strip of steel into a tubular form and joining the edges together by a continuous welding process. The process results in weld fins which project radially inwardly and outwardly and which are then removed during the manufacturing process by a fin-cutting operation. However, there is normally still a witness of the welded seam left after tube manufacture is completed, which may take the form of a slight depression or a slight raised rib of irregular cross-section running axially along the tube. Also, the material of the tube in the immediate vicinity of the welded seam is usually harder than the remainder. This still applies even if the tube is subsequently subjected to one or more "drawing" operations to reduce its thickness. Therefore when the tubing is subsequently subjected to any form of manipulation, such as the closure operation at the top end of a twin-tube shock absorber, there is a tendency for the welded seam to deform differently from the remainder, and for any depression or raised portion in the bore of the tube to be accentuated. This can cause difficulty with the sealing arrangement at the top end of the shock absorber, since the elastomeric seal is usually an item such as a rubber 'O'-ring or a suitably shaped bead formed on the outer periphery of the main sealing member. The axial length of engagement between such a member and the bore of the outer cylinder is relatively short and the effectiveness of the sealing arrangement is dependent entirely on the condition of the seam in the tube at the point of contact with the sealing member.

It is of course possible to remove the seam completely by a machining operation in the bore of the outer cylinder, but this adds cost and reduces the wall thickness of the tubing and hence its strength.

5. In most of the designs of twin tube shock absorber forming the known art, in order to perform the final closing operation, whether it be by welding or by deformation of the outer cylinder, it is necessary to grip the outer cylinder securely either to turn it or to prevent it from turning, or to prevent it from moving in an axial direction, according to the process used. The force exerted by such a gripping operation tends to damage or mark the surface of the outer cylinder, particularly if it has already been subjected to a finishing process such as painting, and hence it is normally necessary to carry out the painting operation after completing the final closing operation.

This necessity severely restricts the types of painting or other finishing operation which may be used, particularly if the process involved subjecting the finished shock absorber to elevated temperatures such as those required by stove-enamelling or electro-phoretic dipping. Elevated temperatures may damage the elastomeric material of the shock absorber seal(s) and may be hazardous due to the presence of oil in the shock absorber. Also the amount of heat required to raise the temperature of a complete shock absorber is much greater than that required to heat the outer cylinder only. Therefore the time, and hence the cost, of the heating process and the subsequent cooling period is also increased.

The present invention relates to both a shock absorber design and a method of assembly technique which have as their joint objectives the overcoming of some or all of the disadvantages listed above. It also relates to a method of introducing a charge of pressurised gas into the shock absorber in cases where this is required.

According to the present invention, there is provided a twin-tube shock absorber of a "sealed for life" construction comprising an outer cylinder, an inner cylinder, a piston rod housed within the inner cylinder, a guide member to locate the piston rod within the inner cylinder and a metal insert seal located inside the top end of the outer cylinder, above the guide member, and slidably embracing the piston rod, characterised in that the guide member is clamped in place within the shock absorber by a circumferential shoulder in the outer cylinder, which is produced, after assembly of the internal parts, by a lateral swaging operation which creates a reduced diameter, parallel portion of the outer cylinder above the shoulder.

Preferably, the metal insert seal is of substantially tubular form at its lower end, with a covering of elastomeric material over its outer diameter, the covering of elastomeric material being compressed by the said parallel portion of the outer cylinder being crushed radially into contact with it during assembly so as to form a pressure tight seal therebetween.

Preferably, the clamping operation is carried out before the assembly of the metal insert seal.

Advantageously, the reduced diameter parallel portion of the outer cylinder above the shoulder is produced by a preliminary lateral swaging operation which crushes that portion of the tube onto the surface of a rigid mandrel which is positively located in respect to the various shock absorber diameters, thus ensuring roundness and concentricity of the reduced diameter portion, prior to a second stage in which the outer cylinder is crushed further radially inwardly into contact with the metal-insert seal to form said pressure-tight seal therebetween.

Where required, pressurised gas can be inserted into the shock absorber through a gap around the outside of the metal insert seal prior to the gap being closed by the outer cylinder being crushed radially into contact with the seal.

The invention is described further hereinafter, by way of example only, with reference to the accompanying drawings, wherein:

FIGS. 3, 4 and 5 illustrate a first assembly technique in accordance with the present invention.

Figure 1:
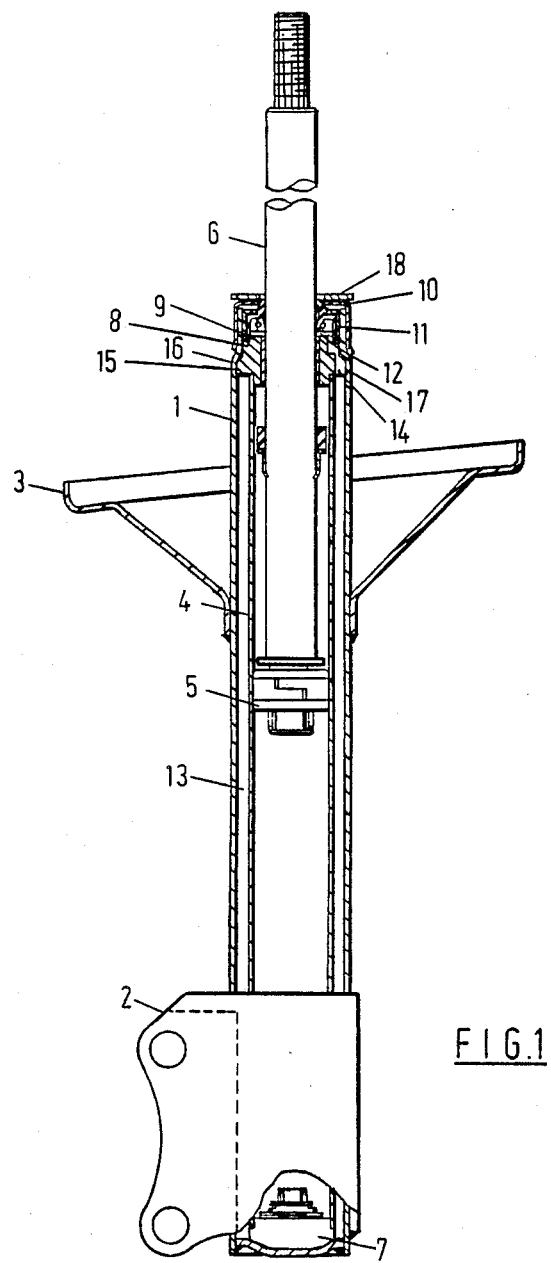
FIG. 1 is a sectional view of a twin-tube shock absorber used on a Macpherson strut and incorporating the present invention.
Figure 2:
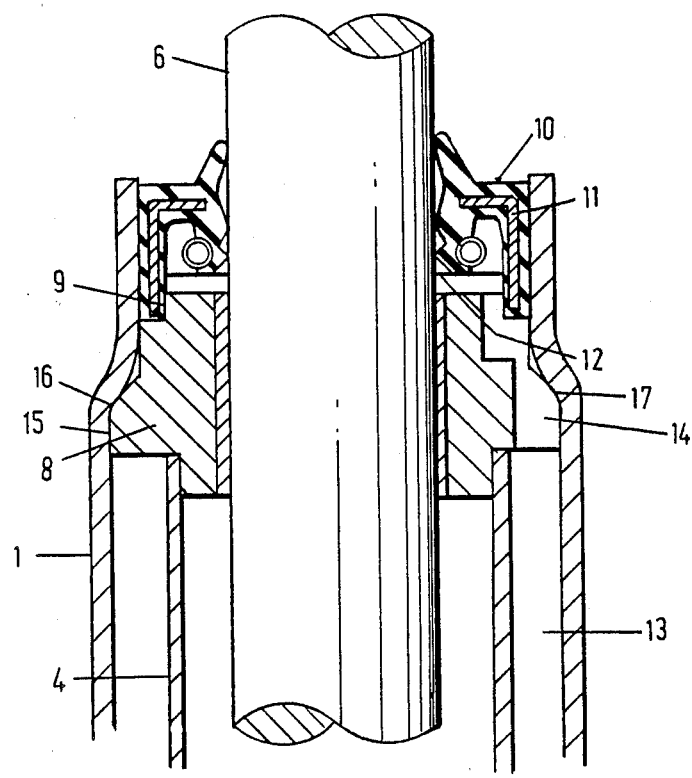
FIG. 2 is an enlarged sectional view of the top end of the shock absorber of FIG. 1.

Referring first to FIGS. 1 and 2, outer cylinder 1 may, according to the application requirements of the vehicle in which it is to be installed, carry a variety of externally attached components such as pressed steel bracket 2 to carry the wheel spindle, or a wheel spindle itself, or a pressed steel spring seat 3 to locate the bottom end of the vehicle road spring or any other attachment devices. The present invention however applies even if none of these items is incorporated.

Inner cylinder 4 houses a piston 5 connected to the bottom end of the piston rod 6. The bottom end of the inner cylinder 4 is closed by a foot valve assembly 7 which also serves to centralize the bottom end of the inner cylinder 4 in the outer cylinder 1. The top end of the inner cylinder 4 is closed by a guide bearing member 8 in which the piston rod 6 is slidably engaged. This guide bearing member 8 also serves to centralise the top end of the inner cylinder 4 in the outer cylinder 1. The inner cylinder 4 is full of hydraulic fluid on both sides of the piston 5, as is the lower part of the annular reservoir 13. The foot valve assembly 7 and both sides of piston 5 are provided with valves which permit the passage of oil from one side of the piston 5 to the other according to its direction of motion, and from the inner cylinder 4 to the annular reservoir 13 and back again, as the piston rod volume enters and leaves the inner cylinder 4. The upper end of guide bearing member 8 carries a register of spigot diameter 9 which is produced concentrically with the bore and with the other diameters of guide bearing member 8. This register 9 serves to support and locate the bottom end of a metal-insert seal 10.

Metal-insert seal 10 is manufactured from an elastomeric material, such as rubber, and has bonded within it a metal insert 11 which serves to isolate and separate the two functional areas of the seal, viz:

(a) Sealing lips 12 which operate in contact with the piston rod 6 during its sliding motion relative to guide bearing member 8, and (b) an interference fit between seal 10 and outer cylinder 1 which provides a static seal.

The metal-insert seal 10 differs from seals of conventional design in that the axial length of the metal insert 11 and its surrounding coating of elastomeric material is extended downwards to provide a locating register on the spigot diameter 9 whilst still leaving a gap between the top face of guide bearing member 8 and the lowest edge of sealing lips 12. This gap is necessary to facilitate the passage of oil leaking from the inner cylinder 4 past the running clearance, which necessarily exists between piston rod 6 and guide bearing member 8, back into the annular reservoir 13 via axial stepped drain slots 14 distributed around the periphery of guide bearing member 8.

Also around the periphery of guide bearing member 8 is formed a circumferential ledge 15 which may conveniently, but not essentially, have a radius 16 formed on its upper edge.

After all the internal parts of the shock absorber have been assembled together, the upper portion of outer cylinder 1 which is initially of substantially constant diameter over its whole length, is reduced in diameter in such a manner that the radius at the point 17 where the reduction in diameter occurs, mates with the circumferential ledge 15 around the periphery of guide bearing member 8. The operation to reduce the diameter of outer cylinder 1 is carried out in such a manner that an axial tensile stress is generated within it and thereby causes the internal parts housed within the outer cylinder 1 to be clamped together securely.

The amount of the reduction in diameter of outer cylinder 1 is adjusted to provide an adequate interference fit between the bore of its reduced diameter and the outer diameter of metal insert seal 10. The layer of elastomeric material round the outer rim of metal insert seal 10 is squeezed between the reduced bore diameter of outer cylinder 1 and the rigidly supported metal insert 11, thus forming an exceptionally good oil-tight seal over the whole of its axial length.

It will be seen that the top end of a twin tube shock absorber constructed to this design and by the assembly technique described hereinafter, has certain advantages over known designs, namely: (a) The comparatively long parallel bore of outer cylinder 1 projecting above the point at which the internal parts are clamped together, provides a much stronger closure than other methods where only the extreme top end of the outer cylinder is either spun or otherwise turned over, or subjected to other forms of purely local deformation.

(b) The contact area of the static seal betwen the inner diameter of outer cylinder 1 and the outer diameter of metal insert seal 10 is greater than normal due to the extended axial length of seal 10, and in particular the seam in the bore of outer cylinder 1 is in contact with the elastomeric seal over the whole of the extended axial length of the seal, thus minimizing the effect of local variations or abnormalities in the seam. This arrangement provides a much more positive seal than can be obtained by conventional designs where the seam only makes local contact with an 'O'-ring or protruding bead incorporated round the periphery of the seal.

(c) Metal insert seals of the generic type used in this design, i.e. those with an axially parallel outside diameter, are normally assembled by pressing the seal into its mating component. The force required for the pressing operation limits the extent of the interference fit which can be utilised. An excessively tight fit may result in distortion of the seal or in local tearing of the elastomeric material during insertion, particularly where it may contact some imperfection in the surface of the mating component such as the seam in outer cylinder 1.

However, in the present arrangement, the seal 10 is assembled into the shock absorber first and then the outer cylinder 1 is reduced in diameter so that it is squeezed down onto the seal. Thus there is no relative axial movement between the seal and its mating component viz, outer cylinder 1 during the creation of the interference fit and hence a much greater radial pressure on the elastomeric material can be obtained with a consequent much better ability for the material to flow into any local irregularity such as the seam in outer cylinder 1.

Some applications of Macpherson struts require a rigidly located platform to be mounted on the upper end of outer cylinder 1 to transmit bump loads imposed under extreme conditions of piston rod travel by an elastomeric bump stop (not shown) carried at the upper end of piston rod 6. In this case a suitably designed and constructed cap or platform, a typical example of which is shown as 18, may be pressed over the reduced upper diameter of outer cylinder 1. The presence or absence of this feature is, however, not an essential part of the present invention.

The manufacturing methods and assembly techniques used in the construction of a twin tube shock absorber according to the present invention are illustrated by reference to FIGS. 3, 4 and 5.

It is preferred for the final closing operation to be carried out in two separate stages:

Stage 1 (FIG. 3)

The shock absorber is first fully assembled with all its internal parts except the insert seal 10 and has had the correct quantity of hydraulic fluid already incorporated into it. The upper portion of outer cylinder 1 projecting above guide bearing member 8 is parallel.

The shock absorber is supported from underneath and is raised by a suitable means A until the top face of guide bearing member 8 makes contact with the bottom face of a hardened steel mandrel B. The bottom face of mandrel B may conveniently have a recess incorporated into it which mates with spigot 9 on the top of guide bearing member 8. Also mandrel B is hollow or has an axial hole provided through its centre to accommodate the portion of piston rod 6 which projects above the top of the shock absorber. This hole may conveniently be of a size such that piston rod 6 is a sliding fit in it.

These features in mandrel B ensure that its location is identical with that of metal insert seal 10 when this is assembled later. The outside diameter of mandrel B is slightly larger than the outside diameter of metal insert seal 10 prior to assembly.

Arranged around the periphery of mandrel B are a multiplicity of jaws C. These jaws C are arranged segmentally within an outer ring D (see FIG. 3). The outer periphery of jaws C is of conical form which mates with a similar conical form on the inner periphery of ring D. The jaws C are spring loaded outwardly so that their mating conical outer surfaces are always in contact with outer ring D. It will be seen that when outer ring D is moved axially upwards relative to jaws C then jaws C contract inwardly until the sides of the jaws touch each other or nearly so, at which stage the bore of the segments of the jaws C forms a circle. The axial movement of outer ring D may conveniently be achieved by a hydraulic cylinder or other conventional means and hence considerable force may be exerted by jaws C.

In their expanded free or 'open' state jaws C encompass the parallel top end of outer cylinder 1. The bottom face of jaws C is carefully aligned axially relative to circumferential ledge 15 around the outer periphery of guide bearing member 8. When the jaws are closed by axial upward movement of outer ring D, the top end of outer cylinder 1 is crushed down onto the outer diameter of mandrel B.

It will be seen that during this operation the movement of jaws C relative to mandrel B is purely lateral. There is no axial relative motion between these two parts. The lateral movement of metal in outer cylinder 1 causes it to stretch over circumferential ledge 15 and thereby generate a tensile stress in the lower portion of outer cylinder 1 thus clamping the internal parts of the shock absorber together.

The magnitude of this tensile stress and hence the magnitude of the clamping force can be varied at will by adjustment of the relative heights of the bottom face of mandrel B and the bottom face of jaws C. Increasing the distance between these two faces increases the clamping force and vice versa.

After completion of this stage of the operation, but whilst jaws C are still closed, mandrel B is withdrawn upwardly. Again this movement may be contrived suitably by a conventional hydraulic cylinder. The fact that jaws C are still closed above the shoulder which has now been formed on outer cylinder 1 provides the necessary reaction to permit mandrel B to be thus removed from the reduced portion of outer cylinder 1 in which it is a very tight fit. It will be seen that it has not been necessary to grip the lower portion of outer cylinder 1 at any stage of the operation.

Outer ring D is then moved axially downwards to its original position and jaws C consequently open to release the shock absorber, and lifting means A is withdrawn downwardly.

The reduced inside diameter of the top end of outer cylinder 1 produced by this operation is of a very high standard of roundness due to the considerable force with which it has been crushed on to mandrel B. In particular this high crushing force minimizes any tendency of the tube to distort unevenly in the region of the seam. Also the bore thus produced is necessarily concentric with the piston rod 6 and the various diameters of guide bearing member 8 necessary to ensure correct functioning of metal insert seal 10 when this is fitted at Stage 2.

Figure 5:
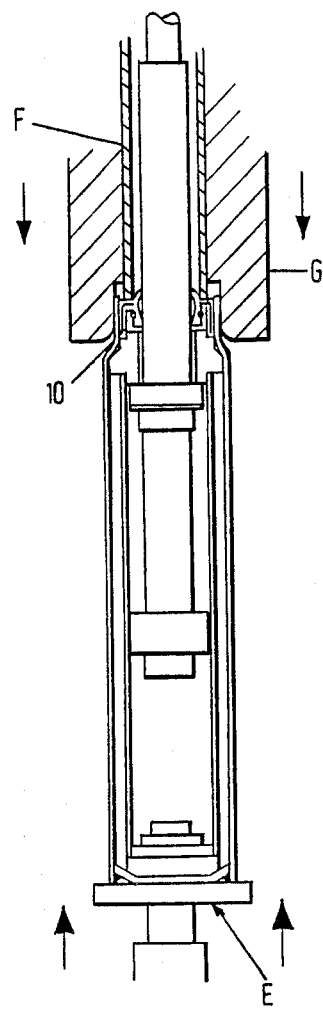

Stage 2 (FIGS. 4 and 5)

Metal-insert seal 10 is assembled over piston rod 6 and is inserted into the top end of outer cylinder 1 so that its bottom edge is located over spigot 9 on the top of guide bearing member 8. Piston rod 6 is fully extended. There is a small annular gap "x" between the outside diameter of twin lip seal 10 and the inside diameter of outer cylinder 1 (See FIG. 4).

The final closing operation is shown diagrammatically in FIG. 5. The shock absorber is supported from underneath and is raised by a suitable means E until the top face of twin lip seal 10 makes contact with the bottom face of a fixed hollow mandrel F. Lifting means E is then locked to support any downward thrust on the shock absorber. The inside diameter of mandrel F may conveniently be a sliding fit on piston rod 6.

Swaging tool G is axially aligned with mandrel F and may, if desired, by slidably engaged on it.

Swaging tool G is actuated downwardly by suitable conventional means such as hydraulic cylinder (not shown).

The bore of swaging tool G is smaller than the outside diameter of outer cylinder 1 and therefore when swaging tool G is actuated downwardly it crushes outer cylinder 1 onto metal insert seal 10 thus causing the outer layer of elastomeric material round twin lip seal 10 to be tightly compressed between outer cylinder 1 and the metal insert bonded within metal insert seal 10.

Because the metal insert is flanged inwardly at its top end and is rigidly located on spigot diameter 9 as its bottom end the arrangement is exceptionally strong in the radial direction and much higher than normal compressive loads can be induced in the elastomeric material without risk of distortion of the seal or other components.

Swaging tool G is then retracted upwardly against the reaction of fixed mandrel F. Lifting means E is unlocked and lowered. It will be seen that once again it has not been necessary to grip the outside of cylinder 1 at any stage during the process.

Pressurisation

Some applications of twin tube shock absorbers are required to have the normal air space within the shock absorber augmented by a charge of pressurised gas such as compressed air or an inert gas such as nitrogen.

In the case of a shock absorber with a top end designed and constructed according to the present invention, a ready opportunity exists to carry out the pressurising operation between Stage 1 and Stage 2 of the final closing operation, with the minimum alteration to the assembly process and equipment.

It will be recalled that after Stage 1 and prior to Stage 2 the twin lip seal 10 is assembled over piston rod 6 and is inserted into the top end of outer cylinder 1. In this condition a circumferential gap exists around the outside of the seal through which the pressurised gas can be passed into the shock absorber. (See FIG. 4).

Figure 6:
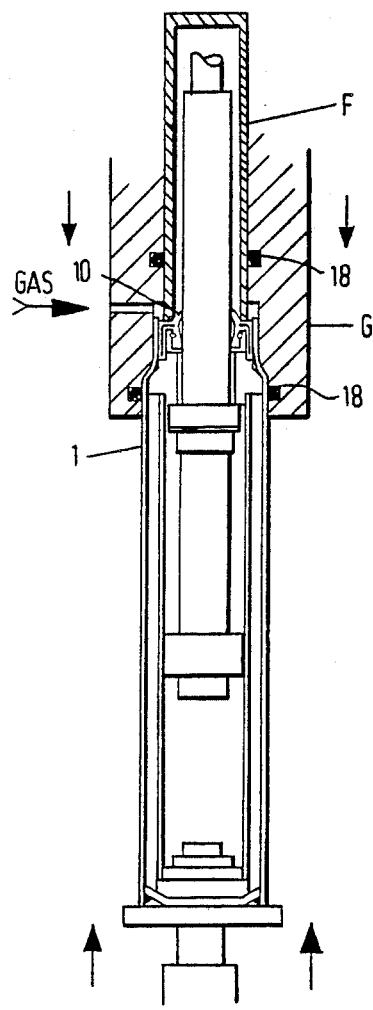
FIG. 6 illustrates a technique for introducing pressurised gas into the shock absorber.

All that is necessary during the first part of Stage 2 is to seal off the air space around the top of the shock absorber as shown diagrammatically in FIG. 6. Swaging tool G is extended axially downwards and is provided with an additional larger bore as its bottom end which slidably engages around the larger lower diameter of outer cylinder 1. This bore is provided with a sealing medium such as a rubber "O"-ring 18, as is its upper bore which is slidably engaged around fixed mandrel F. The hole in the centre of fixed mandrel F is closed at its upper end.

Therefore during Stage 2 when the shock absorber has been raised to bring the top face of metal insert seal 10 into contact with the bottom face of fixed mandrel F, a completely sealed air volume exists, comprising the air space within the shock absorber itself and the external volume contained within swaging tool G and fixed mandrel F. The required gas pressure is then applied via a suitable aperture in the side of swaging tool G or at any other convenient point and the pressure is maintained during the downward motion of swaging tool G. Once the swaging operation is completed the gas pressure is sealed permanently within the shock absorber. The gas pressure is then switched off and the remainder of Stage 2 is completed as already described. The proper functioning of a gas pressurised twin tube shock absorber may necessitate detail changes to the internal parts as previously described or the provision of certain additional parts. These changes however do not affect the principles outlined in the description of the present invention.

Whilst the preferred method of closing a shock absorber according to the present invention is to carry out the operation in two stages as previously described, it is of course possible to do it in a single operation by sacrificing some of the advantages already detailed.

Thus, referring to FIG. 3 (Stage 1) mandrel B is reduced in diameter so that jaws C can no longer make contact with it. In fact it becomes very similar to mandrel F as described in Stage 2. Metal insert seal 10 is assembled over piston rod 6 with its bottom edge located on spigot diameter 9 before commencement of Stage 1. Piston rod 6 is also fully extended. Jaws C crush outer cylinder 1 directly on to twin lip seal 10 thus completing the assembly in a single operation.

I claim:

1. A twin-tube shock absorber comprising an outer cylinder, an inner cylinder, a piston rod housed within said inner cylinder, a guide member to locate said piston rod within said inner cylinder and a metal insert seal located inside the top end of said outer cylinder, above said guide member, and slidably embracing said piston rod, wherein said guide member defines a circumferential ledge, and the upper portion of said outer cylinder is reduced in diameter to define a circumferential shoulder which mates with said circumferential ledge, and a reduced diameter, parallel portion of said outer cylinder above said circumferential shoulder which provides an interference fit between its reduced diameter and the outer diameter of said metal insert seal.

2. A twin-tube shock absorber according to claim 1, wherein said metal insert seal comprises an annular sealing face in sealing contact with said piston rod and a substantially tubular portion of extended axial length, with a covering of elastomeric material over its outer diameter, said substantially tubular portion of the metal insert seal being clamped over the whole of its length by the said reduced diameter, parallel portion of said outer cylinder so as to compress said covering of elastomeric material and thereby form a pressure tight seal therebetween.

3. A twin tube shock absorber according to claim 2, wherein said substantially tubular portion of said metal insert seal extends axially beyond the lower edge of said sealing face and the bottom end of said substantially tubular portion is supported on and located by said guide member, thereby ensuring that said lower edge of said sealing face of said metal insert seal is spaced from said guide member.

4. A twin tube shock absorber according to claim 3, wherein the upper end of said guide member carries a register which serves to support and concentrically locate the bottom end of said metal insert seal with respect thereto.

5. A method for securing the internal parts of a twin-tube shock absorber having an outer cylinder, an inner cylinder, and a piston rod housed within the inner cylinder, comprising the steps of: inserting a guide member to locate the piston rod within the inner cylinder, the guide member including a circumferential ledge, locating a metal insert seal inside the top end of the outer cylinder above the guide member to slidably embrace the piston rod, performing a lateral swaging operation on the upper portion of the outer cylinder above the circumferential ledge of the guide member to form a circumferential shoulder on the outer cylinder which mates the circumferential ledge and clamps the guide member in place within the shock absorber, and crushing the upper portion of the outer cylinder to form an interference fit between the upper portion of the outer cylinder and the metal insert seal.

6. A method according to claim 5, further comprising the step of pressurizing the shock absorber wherein pressurized gas is inserted into the shock absorber through a gap around the outside of the metal insert seal prior to the gap being closed by the outer cylinder being crushed radially into contact with the seal.

* * * * *